INVENTORS
JULIUS PRAGLIN
BY JOHN R. YEAGER

ATTORNEYS

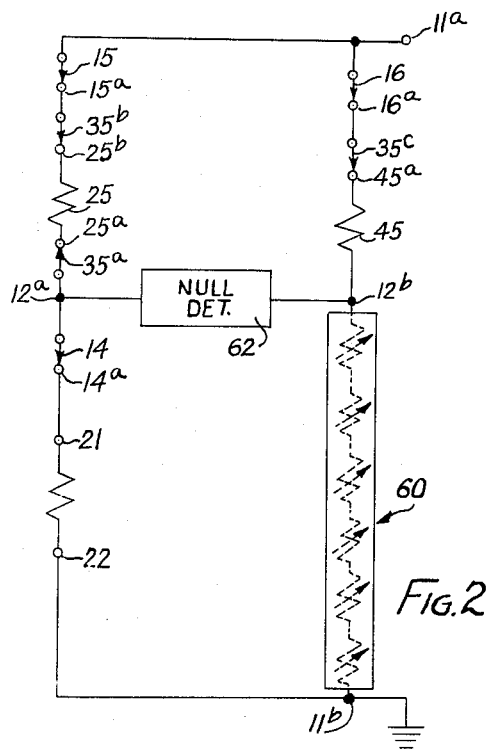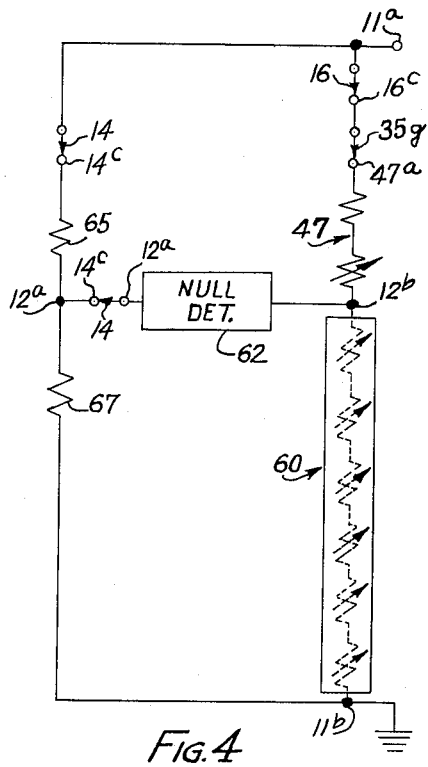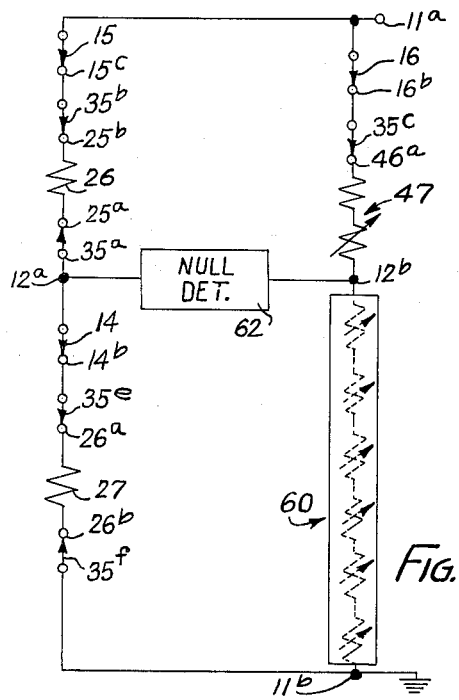

United States Patent Office 3,246,238
Patented Apr. 12, 1966

3,246,238
MEGOHM BRIDGE HAVING A PLURALITY OF STANDARD RESISTORS, AND CALIBRATED IN A LADDER-TYPE OPERATION UTILIZING THE SMALLEST RESISTOR (PRECISION) AS ABSOLUTE STANDARD
Julius Praglin, Cleveland, and John R. Yeager, Cleveland Heights, Ohio, assignors to Keithley Instruments Inc., Cleveland, Ohio, a corporation of Ohio
Filed June 21, 1961, Ser. No. 118,578
7 Claims. (Cl. 324—62)

The present invention relates to bridge-type measuring instruments, particularly to bridge-type measuring instruments for measuring electrical resistances.

A bridge for measuring electrical resistance generally comprises a standard leg and an unknown leg connected in series between the energizing terminals for the bridge and a ratio leg and a balancing read-out leg also connected in series across the energizing terminals. The bridge is constructed and arranged so that various standard resistances might be connected into the standard leg of the bridge. Conventionally, the ratio resistance may be a fixed resistance and the bridge balancing read-out resistance indicates the magnitude of the unknown resistance as a function of the standard. The accuracy of measurement depends upon the accuracy of the resistances used in the bridge. It is often desirable to be able to use resistors as standards whose accuracy is less than that required for desired accuracy of measurement and it is necessary to calibrate the standards when they are used. As an example, resistances below $10^6$ or $10^7$ ohms are available at a reasonable cost with an accuracy which is of the order of $\pm.02\%$, but for larger values of resistors, it is difficult and expensive to obtain resistors having an accuracy of better than $\pm1\%$. Accordingly, it is desirable to use the lower accuracy resistors as standards and to calibrate the standards when measurements are to be made. Conventionally when standards above $10^6$ are used and have to be calibrated, a ladder-type calibrating operation has been utilized to calibrate the standard resistors which are higher in magnitude than $10^6$ and this operation has been performed each time that the standard resistors are to be used. In the laddering method of calibrating the standard resistors, the smallest standard resistor to be calibrated is connected into the bridge as the unknown and is compared with a smaller resistor which is a precision standard. For example, a $10^7$ standard resistor which has an accuracy of $\pm1.0\%$ might be compared to the $10^6$ standard resistor for the bridge which is available with an accuracy of $\pm.02\%$. The bridge is balanced and the reading on the read-out resistance is noted and the ratio resistance in series with the balancing resistance adjusted whenever the $10^7$ resistor is used as the standard. This then requires a note to be made of the compensating factor for the calibrated resistor. After the $10^7$ resistor is calibrated against the $10^6$ resistor, the $10^8$ resistor is then calibrated against the $10^7$ resistor, etc., until all the standard resistors of the bidge have been calibrated. Then, each time that one of the standard resistors higher than $10^6$ is connected into the bridge as the standard thereof, the ratio resistance must be adjusted in accordance with the noted compensation.

An important object of the present invention is to provide a new and improved bridge-type measuring instrument for measuring resistances by comparing the unknown resistance with the standards which are not free from drift within tolerable limits, the bridge being so constructed and arranged that the instrument can be readily and quickly calibrated and set to automatically compensate for the variation in the standard resistors and the variation automatically compensated for whenever a calibrated standard resistor is connected into the bridge as a standard.

Another object of the present invention is to provide a new and improved bridge-type resistance measuring instrument in which the standards of the bridge which must be calibrated during use have an individual corresponding ratio resistance which is connected into the bridge circuit whenever the corresponding standard resistance is connected into the bridge circuit and which is adjustable to compensate for variations in the standard and can be preset to the value necessary to effect the compensation.

A further object of the present invention is to provide a new and improved bridge-type measuring instrument as in the preceding objects wherein the adjustable ratio resistances may be quickly and easily set to the magnitude necessary to compensate for variation in the corresponding standard.

Still another object of the present invention is to provide a new and improved bridge-type resistance measuring instrument wherein standard resistors subject to drift and requiring calibration have associated therewith a corresponding ratio resistance which is to be connected into the ratio leg of the bridge when the standard resistor is connected into the bridge as the standard thereof and wherein the standard resistors subject to drift may be selectively connected into the bridge as the unknown and compared with another standard resistor and then the standard resistor being used as the bridge standard and its corresponding ratio resistance disconnected from the bridge and a transfer network selectively connected to the bridge as the standard and unknown legs and the ratio resistance corresponding to the standard being calibrated connected into the ratio leg.

A still further object of the present invention is to provide a new and improved bridge-type resistance measuring circuit wherein a series of standard resistors have magnitudes which progress by a predetermined factor and wherein the smallest standard resistor is of a higher precision than the other standard resistors of the series and wherein the standard resistors have associated therewith ratio resistance means including an adjustable individual ratio resistance means for each of the standard resistors to be calibrated against the smallest resistor, the instrument further including means for selectively connecting any of said standard resistors into the bridge as the standard thereof and the associated ratio resistance into the bridge as the ratio leg of the bridge, or for connecting a selected one of the standard resistors into the bridge as the standard and its associated ratio resistance into the ratio leg of the bridge and the next larger standard resistor into the standard leg of the bridge as the unknown, the bridge still further including a transfer ratio network which is selectively connectable into the bridge as the unknown and standard legs with the resistances of the transfer ratio network being related by the same factor as the standard resistors.

Further objects and advantages of the present invention will be apparent from the following description of the preferred embodiment thereof made with reference to the accompanying drawings forming a part of the present specification and in which:

FIG. 2 is a simplified circuit diagram of the bridge network of FIG. 1 with the bridge network set to measure unknown resistances;

FIG. 3 is a simplified circuit diagram of the bridge network of FIG. 1 showing the condition of the network when set to "Standardize"; and FIG. 4 is a simplified circuit diagram of the bridge network of FIG. 1 showing the condition of the network when set to "Calibrate."

Figure 1:
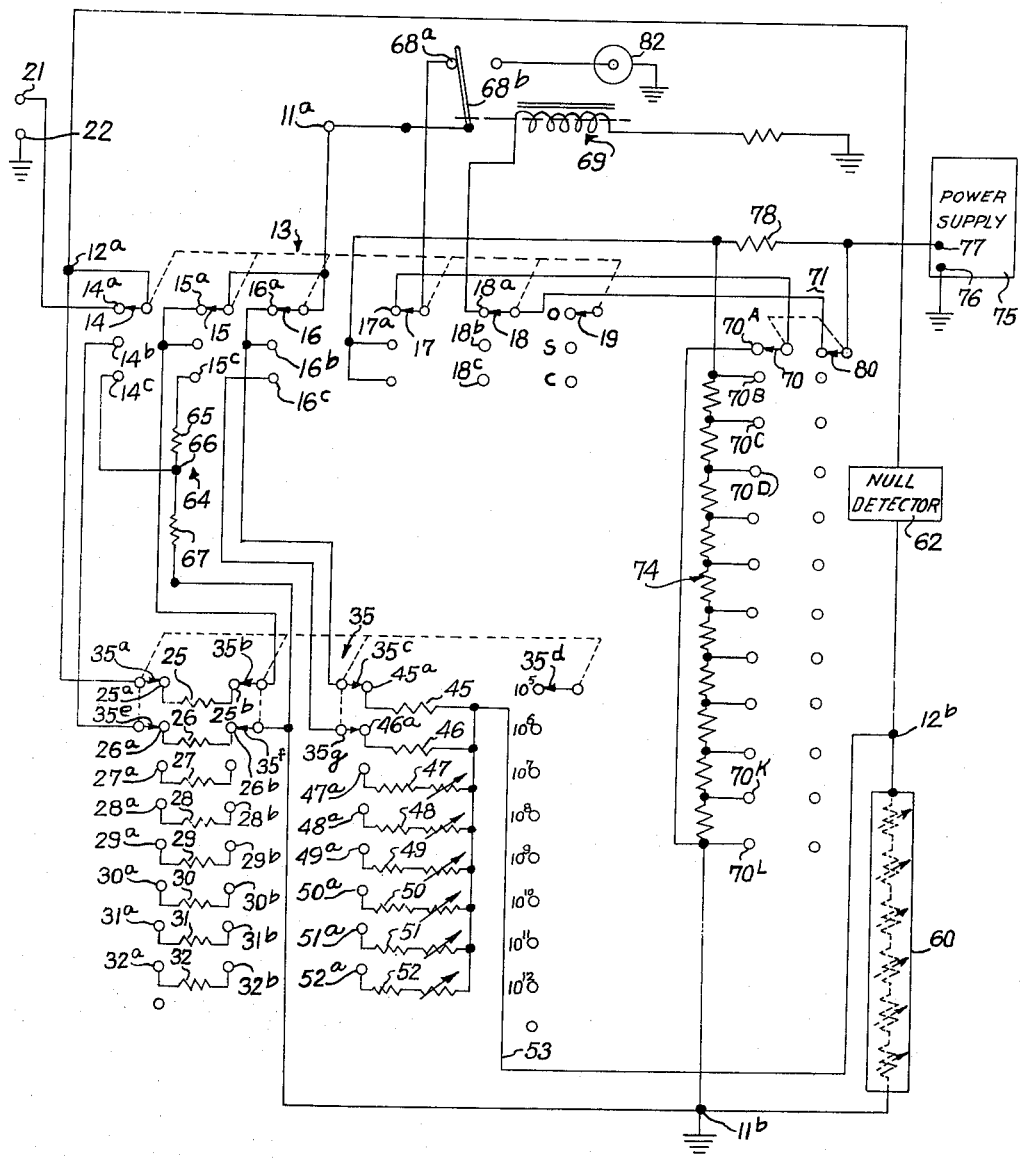
FIG. 1 is a schematic diagram of a resistance measuring bridge network embodying the present invention.

In accordance with the preferred and illustrated embodiment of the present invention, a bridge-type resistance measuring instrument is provided which has standards whose stability is such that the resistors have to be periodically calibrated. The instrument includes a plurality of standard resistors which are to be selectively connected into one leg of the measuring bridge as the bridge standard and for each of the standard resistors which are subject to objectionable drift, a corresponding, or respective ratio resistance is provided and the ratio resistance is adjustable and can be preset to compensate for drift and is connectable into a leg of the bridge to compensate the bridge for drift in the standard. In the preferred and illustrated embodiment, the standard resistors which are to be connected into the bridge are selected by operating a switch which connects the selected resistor into the standard leg of the bridge and the respective ratio resistance into the ratio leg of the bridge.

The preferred and illustrated embodiment also includes, as a feature of the present invention, connecting means, which may be in the form of switches, for selectively connecting the standards which are subject to drift and which are to be recalibrated during use of the instrument into the leg of the bridge where the unknown is usually connected and to simultaneously connect a standard resistance against which the one connected into the unknown leg of the bridge is to be calibrated into the standard leg of the bridge. The measuring instrument further preferably includes a ratio network which is comprised of two resistance legs related to each other by the same factor as the factor by which the standards are designed to be related and this ratio network is connectable into the bridge circuit as the standard leg and as the unknown leg. The ratio network may be termed a transfer network since by connecting the ratio network into the bridge, the variation of a standard resistor, which had been determined by adjusting the read-out balancing resistance to balance the bridge with the standard resistor being calibrated connected into the unknown leg of the bridge, can be transferred to the compensating resistance by connecting the ratio network and the compensating resistance into the bridge and adjusting the compensating ratio resistance until the bridge is again balanced.

During use, a standard resistor which is subject to drift is calibrated by connecting the standard resistor into the unknown leg of the bridge and a precision or calibrated standard resistor and corresponding ratio resistance into the corresponding legs of the bridge. The bridge is then balanced by adjusting a read-out resistance in the balancing leg of the bridge and the magnitude of the read-out resistance will indicate the resistance variation of the standard being calibrated from its designed value. A transfer network comprising resistances related in the same ratio as the standard resistor being calibrated and the standard against which it is being calibrated is connected across the energizing terminals to, in effect, substitute for the standard leg of the bridge and the unknown leg of the bridge and the ratio resistance corresponding to the standard being calibrated is connected into the ratio leg. This transfer network is a high precision network. The ratio resistance is then adjusted to bring the bridge back to balance and now the ratio resistance has been adjusted to compensate for variation of the standard resistor from its designed value. When the standard resistor is subsequently connected into the standard leg of the bridge as the bridge standard as, when measuring an unknown resistance, the corresponding ratio resistance is connected into the ratio leg and the bridge network is then set so that the read-out dials will accurately show the relationship of the unknown with respect to the designed value of the standard.

Referring to the drawings, a bridge network for measuring resistance is shown and has energizing terminals 11a, 11b and bridge balance detecting terminals 12a, 12b. The measuring instrument includes a selector switch 13 shown schematically as including a plurality of movable switch arms 14, 15, 16, 17 and 18, the switch arms being ganged and movable to three positions corresponding to three different switch positions, O, S, C by means of manually movable arm 19. In each switch position, each switch arm cooperates with a respective contact corresponding to that position of the switch and the contacts are designated by the same reference numeral as the corresponding switch arm with the letters a, b, or c, appended thereto. The contacts engaged in the first position of the switch are designated by the reference characters 14a . . . 18a; the contacts engaged in the second position of the switch are designed by the reference characters 14b . . . 18b, etc.

The switch arm 14 is connected to the energizing bridge balance detecting terminal 12a and when in the first position of the switch 13 where it engages contact 14a, connects the terminal to a plug-in terminal 21 to which one end of an unknown resistance may be connected to make electrical connection to the bridge. The other plug-in terminal for the unknown is shown schematically on the drawing and is designated by the reference numeral 22 and is connected to the energizing terminal 11b of the bridge through ground, as indicated in FIG. 1. When the bridge is used to measure an unknown, the unknown is connected between plug-in terminals 21, 22.

Resistance measuring bridges conventionally have associated therewith a plurality of standard resistors which are connectable into the bridge circuit and with which the unknown is compared. A plurality of such standard resistors are provided in the preferred and illustrated embodiment and these standard resistors are designated respectively by the reference numerals 25, 26, 27, 28, 29, 30, 31, 32. The standard resistors 25 . . . 32 have magnitudes which are to provide a series of resistors which when progressing from the smallest to the largest are all related to the next resistor of the series by a predetermined factor. In the preferred and illustrated embodiment, the resistors are related by a factor of 10, and, by way of example, the resistor 25 has a resistance of $10^5$ ohms; the resistor 26, a resistance of $10^6$ ohms; the resistor 27, a resistance of $10^7$ ohms, and the resistors 28, 29, 30, 31, 32 resistances of $10^8$, $10^9$, $10^{10}$, $10^{11}$, $10^{12}$ ohms, respectively. When measuring an unknown, the standard resistors can be selectively connected into the bridge to provide a standard leg of the bridge connected between the energizing terminal 11a and the bridge balance detecting terminal 12a so that the standard is connected in series with the unknown across the energizing terminals 11a, 11b.

A switch 35 is provided for selecting the standard resistor which is to be connected into the standard leg of the bridge. The switch 35 includes the switch arms 35a, 35b, 35c, 35d, 35e, 35f and 35g. The switch 35 is, in the preferred and illustrated embodiment, an eight-position switch and in each position of the switch the switch arms 35a, 35b engage separate contacts corresponding to that switch position. One of the standard resistors 25 . . . 32 is connected between each pair of contacts corresponding to a particular switch position for the arms 35a, 35b. The contacts have, therefore, been given the same reference numeral as the standard resistors connected therebetween, with the contacts engaged by the switch arm 35a having an "a" appended thereto and the contacts engaged by the switch arm 35b having a "b" appended thereto. Accordingly, in the first switch position, the arms 35a, 35b engage the contacts 25a, 25b between which the standard resistor 25 is connected, and in the second switch position engage contacts 26a, 26b between which the standard resistor 26 is connected, etc. The switch arm 35a is connected to the bridge balance detecting terminal 12a and the switch arm 35b is connected to the contact 15a of switch 13.

The switch arm 15 of switch 13 is connected to the energizing terminal 11a so that when the switch 13 is in its "Operate" position "O" where the switch arm 15 is in engagement with contact 15a, the switch arm 35b is connected to the energizing terminal 11a. Consequently, the resistor connected between the switch arms 35a, 35b is connected into the standard leg of the bridge when switch arm 15 engages contact 15a. It can now be seen that the switch 35 can be operated to select the standard resistor which is to be connected into the bridge network as the bridge standard.

The switch 35 also effects the connection of a ratio resistance into a leg of the bridge, hereinafter termed the ratio leg, which is connected to the energizing terminal 11a and to the bridge balance detecting terminal 12b. Referring to FIG. 1, it will be seen that a plurality of ratio resistances 45, 46, 47, 48, 49, 50, 51, 52 are provided and correspond respectively to the standard resistors 25, 26, 27, 28, 29, 30, 31, 32. The ratio resistances are all connected to a common connection 53 which connects one end of each of the resistors to the bridge balance detecting terminal 12b and each of the ratio resistances has its other end connected to a respective contact of the switch 35, which contact is designated by the same number as the ratio resistance with an "a" appended thereto. A different one of the contacts 45a ... 52a is engaged by the switch arm 35c of the switch 35 for each position of the switch; consequently, a different ratio resistance can be selected for each switch position of the switch 35, i.e. for each standard resistance. The switch arm 35c is connected to the contacts 16a and 16b of the selector switch 13 and when switch 13 is in its first position "O" conditioning the circuit to measure an unknown external resistance or in its third position C, the contact engaged by the switch arm 35c is connected to the energizing terminal 11a through the switch arm 16 of the selector switch 13. It can now be seen that, when the selector switch 13 is in its first position, the switch 35 can be operated to any one of eight positions to select any one of eight standard resistors and a corresponding ratio resistance and to connect the selected standard resistor into the standard leg of the bridge and the corresponding ratio resistance into the ratio leg of the bridge. FIG. 2 is a simplified showing of the circuit of FIG. 1 when switch 13 is in its "O" position and switch 35 in its first position.

The instrument includes a read-out bridge balancing resistance 60, which may be in the form of a decade resistance box. The read-out resistance 60 is connected into the balancing leg of the bridge between the bridge balance detecting terminal 12b and the bridge energizing terminal 11b and is, therefore, in series with the ratio leg across the energizing terminals of the bridge and is opposite to the unknown leg of the bridge and is diagonally opposite to the standard leg of the bridge.

For purposes of indicating bridge balance, a detecting device 62 is connected between the bridge balance detecting terminals 12a, 12b and in the illustrated embodiment, the detecting device is schematically indicated as being a null detector. The null detector has been shown in block form since null detectors are well known to those skilled in the art and the detector per se is not part of the present invention.

In the illustrated bridge circuit where the standard resistors have magnitudes as indicated, the ratio resistances may have magnitudes of 100K. The ratio resistances 45, 46 which correspond to the standard resistors 25, 26, respectively, have been shown as single resistors since precision resistors are available for those standards having magnitudes of $10^6$ ohms or below. Resistors up to $10^6$ ohms are available which have magnitudes that are subject to $\pm.02\%$ variation due to drift, etc. For most purposes, this variation is not objectionable and, consequently, the $10^5$ resistor and the $10^6$ resistor do not have to be recalibrated when the instrument is to be used. Consequently, the ratio resistances corresponding to the $10^5$ and $10^6$ resistors, that is resistances 25, 26, may be fixed magnitude resistors. For resistors higher than $10^6$ ohms, the magnitudes of the precision resistors which are available commercially at reasonable cost are subject to drift, etc., of $\pm4\%$; consequently, when this variation in the standard resistors is objectionable, it is necessary to compensate the instrument for the drift in the standard resistors subject to the objectionable drift. In accordance with the present invention, the standard resistors subject to objectionable drift are calibrated and the instrument compensated by providing a corresponding ratio resistance which is adjustable. Accordingly, the ratio resistances 47 ... 52 are each comprised of a fixed resistor which, in the illustrated embodiment, may be 95K, and a variable resistor having a maximum magnitude of 10K, so that the total resistance of the ratio resistance may be varied between 95K and 105K. The adjustable resistors are each connected in series with a corresponding fixed resistor to form a single ratio resistance and each pair will hereinafter be referred to as merely the ratio resistance.

The setting of the ratio resistance for each of the standard resistors 27 ... 32 is determined in a laddering-type calibrating operation. For this purpose, the switch 13 is first moved to its second switch position S wherein the switch arms 14 ... 18 are in engagement with the contacts 14b ... 18b. In this position, the switch arm 14 is moved from the terminal 14a which connects the unknown terminal 21 into the bridge and into engagement with the contact 14b which is connected to the switch arm 35e to connect the latter to bridge terminal 12a. The switch arm 35e is ganged with the switch arm 35a and is adapted to engage the contacts 26a ... 32a. When the switch 35 is in its first position wherein the switch arm 35a is in engagement with the contact 25a, the switch arm 35e is in engagement with the contact 26a and as the switch 35 is operated to its succeeding positions, the contact 35e successively moves into engagement with the contacts 27a, 28a, 29a, etc. The switch arm 35f of the switch 35 is in engagement with the contact 26b when the switch 35 is in its first position with the switch arm 35a in engagement with the contact 25a and switch arm 35f is moved successively into engagement with contacts 27b, 28b, 29b, etc., by movement of switch 35 to its various positions. Consequently, for each position of the switch 35, with the exception of its last position where the switches 35a, 35b are in engagement with contacts 32a, 32b, the switch arms 35e, 35f make connection to a respective one of the resistances 26 ... 32. The switch arm 35f is always connected to terminal 11b and since switch arm 35e is connected to terminal 12a, when switch 13 is in its "S" position, the standard resistor selected by arms 35e and 35f is connected into the bridge as the unknown of the bridge. In the disclosed embodiment the resistance which is connected into the bridge as the unknown is the next resistance in the series to the standard resistor between the switch arms 35a, 35b.

It will be noted that the movement of the switch arm 16 from the contact 16a to the contact 16b does not effect the connection of the selected ratio resistances corresponding to the standard resistor selected by switch arms 35a, 35b since the contact 16b is interconnected with the contact 16a and, therefore, the ratio resistance which is connected to the contact engaged by the switch arm 35c of the switch 35 is connected into the ratio leg of the bridge. Accordingly, when the selector switch 13 is in its second position, one standard resistor is connected into the standard leg of the bridge and the next standard resistor of the series is connected into the unknown leg of the bridge and the compensating resistance corresponding to the standard connected into the standard leg of the bridge is connected into the ratio leg of the bridge.

To standardize the $10^7$ resistor against the $10^6$ resistor, switch 13 is moved to the "S" position and the switch 35 is moved to its second position where the switch arms 35a, 35b are in engagement with the contacts 26a, 26b to connect the standard $10^6$ resistor 26 into the standard leg of the bridge and where the switch arms 35e, 35f are in engagement with the contacts 27a, 27b to connect the $10^7$ standard resistor 27 into the unknown leg of the bridge, and in this position the switch arm 35c is in engagement with the contact 46A to connect the ratio resistance 46 into the ratio leg of the bridge. FIG. 3 is the simplified circuit corresponding to this setting of the instrument. If the bridge balances, the read-out resistance would have to be set at $10^6$, assuming that the standard resistor 27 was at its designed value, since the ratio resistance is $10^5$ ohms and $$\frac{S}{U} = \frac{R}{B} \text{ or } \frac{10^6}{10^7} = \frac{10^5}{B}$$

where S is the standard resistor, U is the unknown resistance, R is the ratio resistance, and B is the balancing resistance. This reading would be accurate within .02% when the standard resistor $10^6$ is accurate within .02%. If, however, the standard resistor 27 has drifted 4%, the setting of the standard resistance box will have to be about $1.04 \times 10^6$ in order to provide bridge balance. This variation of the standard resistor being calibrated is indicated by the reading of the balancing resistance 60. It is now desirable to adjust the ratio resistance 47 corresponding to the standard resistor 27 so that, when the standard resistor 27 is connected into the bridge as the standard thereof, the ratio resistance 47 can be connected into the ratio leg to correct for the drift in the standard. To adjust the ratio resistance 47, the selector switch 13 is moved to its third position "C" wherein the switch arms 14 ... 18 are in engagement with the corresponding ones of the contacts 15c ... 18c. In this position, the switch arm 35b is disconnected from the circuit since the arm is not connected to contact 15c and this removes the standard resistor connected between the switch arms 35a, 35b from the bridge network. Similarly, the standard resistor between the switch arms 35e, 35f is also removed from the circuit, since the switch arm 35e is not connected to the contact 14c. The switch arms 14, 15, when in engagement with the contacts 14c, 15c, effect the connection of a ratio network 64 into the bridge in place of the standard leg and the unknown leg. The ratio or transfer network 64 includes a high precision resistor 65 having one end connected to the contact 15c and its other end connected to a junction 66, and a second precision resistor 67 having one end connected to the junction 66 and its other end connected to the energizing terminal 11b. The junction 66 is connected to the contact 14c and when the switch 13 is in its third, or "C" position, the junction 66 is connected to the bridge balance detecting terminal 12a by the switch arm 14 and the end of resistor 65 remote from the junction 66 is connected to the energizing terminal 11a by the switch arm 15.

FIG. 4 is a simplified circuit showing the connections when the switch 13 is in position C and switch 35 is in position to select the $10^6$ and $10^7$ resistors 26, 27. The resistors 65, 67 are high precision resistors and have magnitudes related in the same ratio as the ratio of the standard resistor being calibrated to the standard resistor in the standard leg, i.e., by 10 in the illustrated circuit. With the ratio network 64 connected into the bridge network and the branch normally containing the unknown into the standard leg, the bridge is again balanced by adjusting the ratio resistance. The ratio resistance, however, when the selector switch 13 is moved to its third position is switched from the ratio resistance which corresponds to the standard resistor ($10^6$ resistor 26) which had in the standard leg when the bridge was balanced with the standard resistor ($10^7$ resistor 27) being calibrated in the unknown leg, to the ratio resistance which corresponds to the standard resistor being calibrated. The switch arm 16 of switch 13 when in engagement with contact 16c connects the ratio resistance 47 selected by the switch arm 35g into the bridge circuit rather than the resistance 46 selected by the switch arm 35c, the contact 16c being connected to switch arm 35g. When the ratio resistance is adjusted to rebalance the bridge, the ratio resistance is set to compensate for the variation in the standard being calibrated. This will be appreciated by considering that bridge balance must now meet the condition that $$\frac{1}{10} = \frac{X}{1.04 \times 10^6}$$

in the assumed case and for balance the ratio resistance must be set at $1.04 \times 10^5$. When, during subsequent operation, the standard and its corresponding ratio resistance is connected into the bridge circuit, the instrument will be properly compensated for variations of the standard. This will be apparent by noting that in the assumed case $$\frac{S}{U} = \frac{R}{B} \text{ or } \frac{1.04 \times 10^7}{U} = \frac{1.04 \times 10^5}{B}$$

and if U is exactly $10^7$, B must be set at exactly $10^5$ to balance indicating a reading of $1 \times 10^7$ on its dials.

After the $10^7$ resistor 27 has been calibrated in the manner described, the switch 35 may then be moved to its next position to connect the $10^7$ standard resistor into the standard leg and the ratio resistance in the ratio leg and the $10^8$ standard resistor into the unknown leg, and the calibration operation repeated to calibrate the $10^8$ resistor 28 against the $10^7$ standard resistor 27. The other resistors may then be calibrated in a similar manner.

In the preferred and illustrated embodiment, the energizing bridge may be energized at any one of a plurality of potentials when the switch 13 is in its first or "O" position, and is energized at fixed potentials when the bridge is in its "S" or "C" position.

When the switch 13 is in its first or "O" position, the switch arm 17, which is connected to the energizing terminal 11a of the bridge through a normally closed contact 68a and a movable arm 68b of a relay 69, is in engagement with the contact 17a which is connected to a switch arm 70 of a switch 71. The switch 71 is a multiposition switch and the switch arm 70 engages a different contact in each position of the switch. The contacts engaged by the switch arm 70 have been given the reference numeral 70 with a different letter appended thereto for each contact. The contact 70A is connected to the energizing terminal 11b and when the switch 70 is in the position shown in the drawing, the switch arm 70 is in engagement with contact 70A, and in the other positions of the switch 71, the switch arm 70 is in engagement with one of the other contacts to connect the switch arm 70 to a potential provided by a multitapped resistance 74. The multitapped resistance 74 has a plurality of taps and each is connected to a respective one of the contacts 70B ... 70L, and the resistance 74 is connected across a power supply 75. The power supply has one terminal 76 connected to ground and through ground to the energizing terminal 11b and a second terminal 77 which is connected to one end of the resistance 74 through a resistor 78. When the switch 13 is in position "O" and the switch arm 70 is in engagement with any one of the contacts 70B ... 70L, a portion of the voltage across the multitapped resistance 74 due to the power supply is applied to the energizing terminals, since the switch arm 70, when the selector switch 13 is in its first position O is connected to the terminal 11a through the contacts 17a and switch arm 17 and the contacts 70 and relay arm 71. The voltage applied to the bridge during operation may be varied by operating the switch 71.

When the switch is in its position where the switch arm 70 engages the contact 70A to connect the switch arm 70 to the energizing terminal 11b, a second switch arm 80 of the switch 71 is in engagement with a contact 80a. The switch arm 80 is connected to the terminal 77 of the power supply and the contact 80a is connected to switch arm 18 of selector switch 13. When the selector switch 13 is in its first position, the switch arm 18 engages contact 18a which is connected to one side of the relay 69, the other side of relay 69 being connected to ground. Consequently, with switch 71 in the position shown in the drawing and switch 13 in its "O" position, the relay 69 is energized and the relay arm 68b moved into engagement with a contact 68c. Contact 68c is connected to one terminal of a coaxial plug 82 having the other terminal grounded so that if an external voltage is applied to the coaxial plug, it will appear across the energizing terminals 11a, 11b (terminal 11b is grounded and terminal 11a is connected to one side of the coaxial plug through the relay arm 69b).

It can now be seen that the above enumerated objects and others have been accomplished and that a new and improved apparatus and method have been provided for accommodating the use in a measuring bridge circuit of standard resistors which require periodic calibration in order to assure the necessary accuracy of measurement.

While a preferred embodiment of the present invention has been described in considerable detail, it is my intention to cover all constructions, modifications and arrangements which fall within the ability of those skilled in the art and within the spirit and scope of the present invention.

Having described our invention, what we claim is:

1. In a bridge-type resistance measuring instrument comprising a four-leg bridge having first and second energizing terminals, said bridge further comprising a standard leg and an unknown leg connected in series across said terminals as a first branch and a ratio leg and a balancing leg connected in series across said terminals and providing a second branch, a plurality of standard resistors to be connected into said bridge to provide an exact resistance magnitude including at least one non-precision standard resistor which differs from its standard magnitude so as to require calibration, a plurality of ratio resistance means to be connected into said ratio leg to provide resistance therein, there being a ratio resistance means respective to each non-precision standard resistor which is to be connected into the ratio leg when the respective non-precision standard resistor is connected into the standard leg, said plurality of ratio resistance means being approximately of the same magnitude which magnitude is the resistance to be inserted into the resistance leg when a precision standard resistor is connected into the standard leg and each ratio resistance means respective to a non-precision standard resistor being adjustable to compensate for the difference of its respective standard resistor from the precise magnitude therefor, connecting means for individually and selectively connecting each standard resistor into the standard leg of said bridge and for connecting the respective ratio resistance means into the ratio leg of the bridge, a read-out balancing resistance connected into the balancing leg of said bridge, and means for connecting a resistance to be measured into the unknown leg of said bridge.

2. In a bridge-type resistance measuring instrument comprising a four-leg bridge having first and second energizing terminals, said bridge further comprising a standard leg and an unknown leg connected in series across said terminals as a first branch and a ratio leg and a balancing leg connected in series across said terminals and providing a second branch, a plurality of standard resistors to be connected into said bridge including at least one standard resistor requiring a calibration, a plurality of ratio resistance means including an adjustable ratio resistance means respective to each standard resistor requiring calibration, connecting means for individually and selectively connecting each standard resistor into the standard leg of said bridge and for connecting the respective ratio resistance means into the ratio leg of the bridge when each resistor requiring calibration is connected into the standard leg of the bridge, a read-out balancing resistance connected into the balancing leg of said bridge, means for connecting a resistance to be measured into the unknown leg of said bridge, said selectively connecting means further comprising means for selectively connecting each resistor to be calibrated into said unknown leg as the bridge unknown to calibrate the standard resistor against a standard resistor connected into the standard leg and to which the standard resistor in the unknown leg is related by a predetermined factor, and a transfer network having precision resistance legs related by said predetermined factor and connectable into said bridge as the standard and unknown legs, said connecting means including means for connecting an individual one of said ratio resistances into said ratio leg when said network is connected into said bridge.

3. In an instrument, the structure as defined in claim 2 wherein said connecting means includes first switch means operable to select a predetermined one of said standard resistors and the respective ratio resistance means and to select a different standard resistor to be calibrated against the predetermined standard resistor, and second switching means connected to said first switching means and having a first condition connecting the predetermined standard resistor selected by said first switch means and the respective ratio resistance means of said predetermined standard resistor into said bridge in the standard and ratio legs, respectively a second condition connecting said predetermined standard resistor and said different standard resistor into different ones of said standard and unknown legs of said bridge and in which the ratio resistance means respective to the standard resistor connected into the standard leg of said bridge is connected into the ratio leg, and a third condition connecting said transfer network into the ratio and standard legs of the bridge and the ratio resistance means respective to said different standard resistor into the ratio leg of the bridge.

4. In an instrument for measuring resistance comprising a four-leg electrical bridge having first and second diagonally opposite energizing terminals, said bridge further comprising a standard leg and an unknown leg connected in series across said terminals as two legs of a first bridge branch and a ratio leg and a balancing leg connected in series across said terminals as two legs of a second bridge branch, a plurality of standard resistors having related magnitudes forming a series of resistors in which each of the resistors differs in magnitude from the preceding resistor by a predetermined factor common to all standard resistors, the smallest resistor of said series being a precision resistor against which the other standard resistors are to be calibrated in a ladder-type of calibration operation, connecting means for selectively and individually connecting said other resistors into the standard leg or the unknown leg of said bridge, a plurality of ratio resistances each respective to a one of said standard resistors and each being individually connectable into the ratio leg of said bridge, the ratio resistances respective to the standard resistors to be calibrated being adjustable, first and second resistance legs comprising a transfer network and each comprised of precision resistance means and related in magnitude by said factor, said connecting means including means for connecting said transfer network into said bridge as the standard and unknown legs, and balancing read-out resistance means connected into said balancing leg of said bridge, said connecting means including means for selectively connecting said first and second resistance legs and a ratio resistance into said bridge.

5. An instrument as defined in claim 4 wherein said connecting means comprises a first switching means operable to select a predetermined standard resistor and its respective ratio resistance and to select the adjacent standard resistor of the series and its respective ratio resistance and second switching means connected to said first switching means and having a first means for connecting said predetermined standard resistor selected by said first switch means and its respective ratio resistance into said bridge in the standard and ratio legs, respectively, a second means for connecting said predetermined standard resistor selected by said first switch means and said adjacent standard resistor into said bridge as the standard and unknown, respectively, and for connecting the ratio resistance respective to the standard resistor in the standard leg into the ratio leg of the bridge, and a third means for connecting said transfer network into the bridge and for connecting the ratio resistance corresponding to said adjacent standard resistor into the ratio leg of the bridge.

6. In an instrument for measuring resistance comprising a four-leg electrical bridge having first and second diagonally opposite energizing terminals, said bridge further comprising a standard leg and an unknown leg connected in series across said terminals as two legs of a first bridge branch and a ratio leg and a balancing leg connected in series across said terminals as two legs of a second bridge branch, a plurality of standard resistors having related magnitudes forming a series of resistors in which each of the resistors differs in magnitude from the preceding resistor by a predetermined factor common to all resistors of said series, the smallest valued resistor of said series being a precision resistor against which the other resistors are to be calibrated in a ladder-type of calibration operation, connecting means for selectively and individually connecting said other resistors into the standard leg or the unknown leg of said bridge, a plurality of ratio resistances each respective to one of said standard resistors, the ratio resistances respective to the resistors to be calibrated being adjustable, a transfer network comprising first and second resistance legs each comprised of precision resistance means and related in magnitude by said factor, and balancing read-out resistance means connected into said balancing leg of said bridge, said connecting means comprising switching means having first, second and third conditions and in said first and second conditions being operable to select certain ones of said standard resistors and the respective ratio resistance and to connect a selected one of said standard resistors and the respective one of said ratio resistances into said bridge, said switching means when in said third condition being operable to connect a selected one of said ratio resistances into said bridge and to connect said transfer network into said bridge as the standard and unknown legs of said bridge.

7. In an instrument for measuring resistance comprising a four-leg electrical bridge having first and second diagonally opposite energizing terminals and third and fourth diagonally opposite balance detecting terminals; a series of standard resistors having progressively larger magnitudes and to be calibrated in a ladder-type calibrating operation to calibrate the instrument for measuring unknown resistances; a plurality of ratio resistances each respective to one of said standard resistors, the ratio resistances respective to the resistors to be calibrated being adjustable; first switch means having first and second sets of contacts, each set comprising a contact respective to each of said standard resistors and said standard resistors being connected across the respective contacts of said sets, said first switch means further including a first switch arm and second switch arm respectively engageable one at a time with the contacts of said first and second sets respectively to select one of said standard resistors and a third switch arm and a fourth switch arm respectively engageable one at a time with the contacts of said first set and said second set respectively to select a standard resistor different from the one selected by said first and second switch arms; second switch means including a first movable switch member, first contact means and second contact means engageable by said first movable switch member, a second switch member, third and fourth contact means engageable by said second switch member; means connecting one of said first and second switch arms of said first switch means to one of said first and third terminals and the other of said first and second switch arms to said first contact means; and means connecting said first switch member to the other of said first and third terminals; means connecting one of said third and fourth switch arms of said first switch means to one of said second and third terminals and the other of said third and fourth switch arms to said third contact means, and means connecting said second switch member to the other of said second and third terminals; said second switch means having a first position wherein said first and second switch members engage said first and third contact means respectively and a second position wherein said first switch member engages said first contact means and said second switch member engages said fourth contact means, a first unknown terminal connected to said fourth contact means, a second unknown terminal connected to the one of said second and third terminals different from the one to which said second switch member is connected; a three-terminal transfer network means defining two resistance legs related in the same ratio as the resistors selected by said switch arms and means for connecting said transfer network to said second switch means, said second switch means having a third position wherein one leg of said transfer network is connected between said first and third terminals, and a second leg between said second and third terminals; first and second movable switch elements for simultaneously selecting two of said ratio resistances to be individually connected between said first and fourth terminals, means connecting said movable switch elements to said second switch means and the latter switch means connecting the one of said ratio resistances selected by said first movable switch element into said bridge when in said first and second positions and said second movable element to said bridge when in said third position, and means coupling said switch arms to said movable switch elements for movement as a unit.

References Cited by the Examiner
UNITED STATES PATENTS

| | | | |
|---|---|---|---|
| 2,821,681 | 1/1958 | Baker | 324—62 |
| 2,841,765 | 7/1958 | Harrold | 324—62 |
| 2,951,200 | 8/1960 | Critchlow | 323—75 X |

WALTER L. CARLSON, *Primary Examiner.*